United States Patent [19]

Bleijerveld et al.

[11] 4,386,353
[45] May 31, 1983

[54] THRESHOLD CIRCUIT FOR RADAR VIDEO SIGNALS

[75] Inventors: Hendrik C. Bleijerveld, Borne; Bernard H. M. Oude Elberink, Oldenzaal, both of Netherlands

[73] Assignee: Hollandse Signaalapparaten B.V., Hengelo, Netherlands

[21] Appl. No.: 212,777

[22] Filed: Dec. 4, 1980

[30] Foreign Application Priority Data

Dec. 10, 1979 [NL] Netherlands ............... 7908860

[51] Int. Cl.³ ............................................. G01S 7/28
[52] U.S. Cl. ................................. 343/7 A; 343/5 CF
[58] Field of Search ............... 343/5 VQ (U.S. only), 343/5 CF, 7 A

[56] References Cited

U.S. PATENT DOCUMENTS

| | | | |
|---|---|---|---|
| 3,353,177 | 11/1967 | Wilmot | 343/5 VQ |
| 3,680,095 | 7/1972 | Evans | 343/7 A |
| 3,940,762 | 2/1976 | Ethington et al. | 343/5 VQ |
| 3,995,270 | 11/1976 | Perry et al. | 343/5 CF X |
| 4,023,165 | 5/1977 | Holt et al. | 343/5 VQ X |
| 4,070,673 | 1/1978 | Schmidt et al. | 343/5 VQ X |
| 4,074,264 | 2/1978 | Wilmot | 343/7 A X |
| 4,137,530 | 1/1979 | Hooker, Jr. | 343/5 VQ |
| 4,213,127 | 7/1980 | Cole | 343/5 CF |
| 4,243,988 | 1/1981 | Kany et al. | 343/5 VQ |
| 4,274,095 | 6/1981 | Phipps et al. | 343/5 CF X |

Primary Examiner—T. H. Tubbesing
Attorney, Agent, or Firm—Thomas A. Briody; William J. Streeter; Edward W. Goodman

[57] ABSTRACT

For a threshold circuit for radar video signals the radar coverage is divided into zones constituted by azimuth sectors and range rings, the zones being subdivided into cells formed by radar scans and range quants. The threshold circuit contains a first cell-averaging circuit (1) for determining the average echo strength in each zone pertaining to the azimuth sector that has been scanned by the radar beam. A first zone-averaging circuit (5) is connected to the first cell-averaging circuit (1) for determining from (1) the last established average echo strength of a zone,
(2) the average echo strength of said zone as established after the previous scanning of the relevant azimuth sector by the radar beam, and
(3) the average echo strength of zones adjoining in azimuth and range, a new average echo strength of the zone. From this new average value a threshold level is derived, which threshold level is applied to a gate circuit (10) to pass the video signals received in the individual cells of the relevant zone if said video signals exceed the threshold level.

7 Claims, 2 Drawing Figures

THRESHOLD CIRCUIT FOR RADAR VIDEO SIGNALS

BACKGROUND OF THE INVENTION

The invention relates to a threshold circuit for radar video signals where the radar coverage is divided into zones constituted by azimuth sectors and range rings, the zones being subdivided into cells formed by radar scans and range quants, which threshold circuit comprises a first cell-averaging circuit for determining, from the video signals received in the individual cells, the average echo strength in each zone pertaining to the azimuth sector that has been scanned by the radar beam.

The German Auslegeschrift No. 24 40 742 and the German Offenlegungsschrift No. 28 50 508 describe circuits for the suppression of clutter areas and stationary targets, where the radar coverage is divided as stated above and where the average echo strength is determined in each zone. In the circuit described in the Auslegeschrift this average echo strength is compared with that of zones adjoining in azimuth and range to establish the presence of clutter areas. In the circuit described in the Offenlegungsschrift the average echo strength obtained for each zone is integrated over several antenna revolutions to indicate the presence of stationary targets.

SUMMARY OF THE INVENTION

An object of the present invention is to derive a threshold level from the average echo strength established in each zone, above which level the echo signals from both stationary and moving targets are passed if these signals exceed the average echo strength.

The threshold circuit should be suitable for radar video signals from targets at sea or in a harbor, considering both point targets and extended targets. Since one threshold level is determined for each zone, it is necessary that for the proper functioning of the threshold circuit, the clutter distribution in the zone be substantially homogeneous; for this reason the size of the zones must be kept within limits. A consequence of this is however that extended targets may cover a zone fully or for the larger part. It is therefore another object of the present invention to derive, also for such cases, a threshold level from the average echo strength established in each zone.

To realize the above objects, the threshold circuit as set forth in the opening paragraph is characterized by a first zone-averaging circuit connected to the first cell-averaging circuit for determining, from the last established average echo strength of a zone, from the average echo strength of said zone as established after the previous scanning of the relevant azimuth sector by the radar beam, and from the average echo strengths of zones adjoining in azimuth and range, a new average echo strength of the zone, from which new average echo strength a threshold level is derived, which threshold level is applied to a gate circuit to pass the video signals received in the individual cells of the relevant zone if said video signals exceed said threshold level.

In each zone the average echo strength is established with each antenna revolution. To do so, an averaging process is first performed over the cells of a zone. This is followed by an averaging process over the zones adjoining in azimuth and range and over the average value obtained previously, thus over azimuth, range and time. Hence, the threshold circuit according to the invention is hereinafter referred to as a three-dimensional (3D) threshold circuit.

The averaging process over the zones adjoining in azimuth and range occurs to avoid excessive differences in threshold levels between neighboring zones, and to derive a threshold level in case an extended target covers a zone completely or for the larger part. If the radar video signals are from targets situated in a harbor, it is desirable to blank the zones extending over the land area covered by the radar to exclude them from the averaging processes. If however an extended target fills a zone adjoining a blanked zone, a surrounding part of the target will be lacking so that the averaging process will not be complete. In such a case, a greater weighting factor must be applied to the unblanked target area involved in the averaging process. This may be done in an indirect way by including in the averaging process the average echo strength obtained at a previous time.

DESCRIPTION OF THE DRAWING

The invention will now be explained with reference to the accompanying figures, of which.

DESCRIPTION OF THE PREFERRED EMBODIMENT

Figure 1:
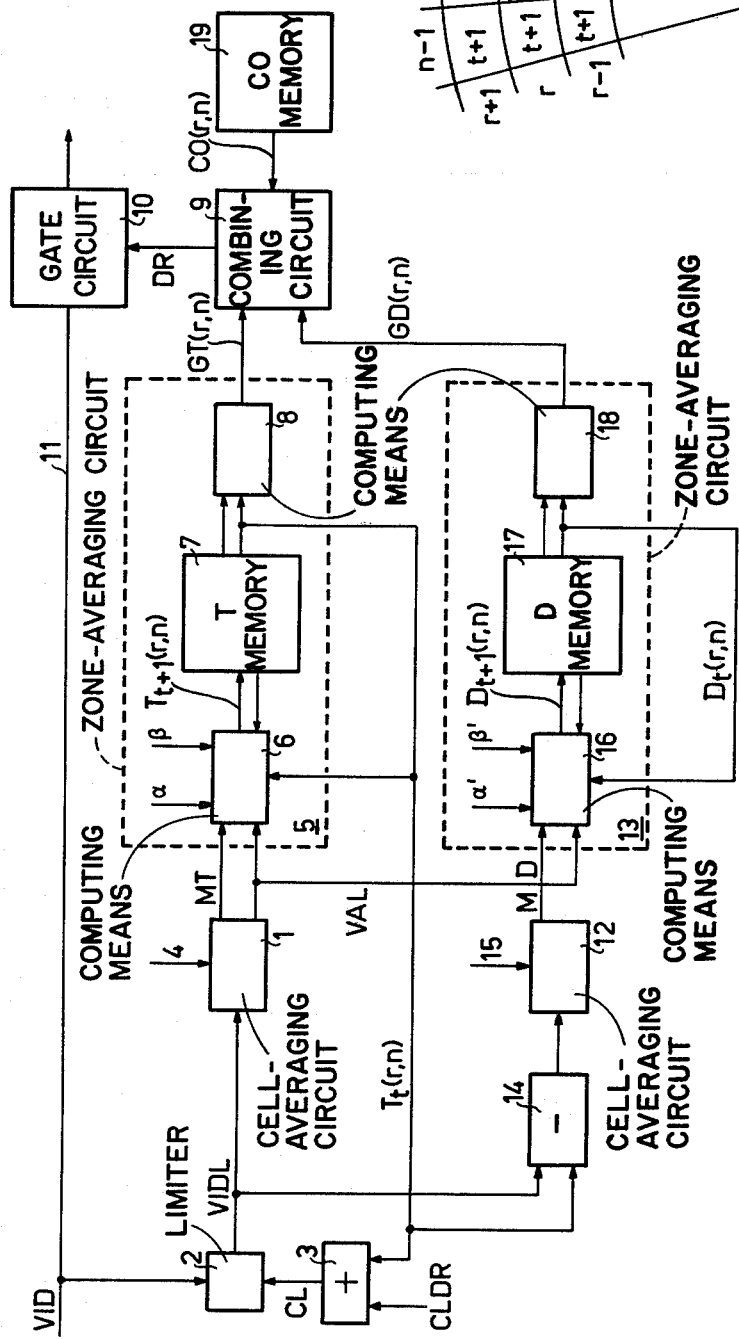
FIG. 1 is a block diagram illustrating an embodiment of the threshold circuit according to the invention.

The coverage of the radar system, of which the 3D threshold circuit forms a part, is divided into zones made up of azimuth sectors and range rings, which zones are subdivided into cells formed by radar scans and range quants. To be able to determine the instantaneous average echo strength in each zone, the threshold circuit of FIG. 1 comprises a first cell-averaging circuit 1. This circuit 1 is supplied with the video signals received in the individual cells. In the embodiment in question, these video signals are not supplied direct but via a limiter 2. In limiter 2 the amplitude of the video signals VID received in each cell is limited to a value CL, determined in a summing network 3 by the previous average echo strength $T_f(r,n)$ of the relevant zone increased by a preset constant CLDR, the previous average echo strength $T_f(r,n)$ having been established in a manner to be described hereinafter. The amplitude limitation by the CL signal is to prevent the threshold level determined in each zone by the threshold circuit from being raised to an excessive value. This limitation is adaptive, as it depends on the average value of the echo strength. Another reason for using limiter 2 is to prevent the "shadow" effect; this is the effect of an increased threshold level in the vicinity of targets. The CLDR value is so selected that clutter echoes are not limited. The output signals of limiter 2 applied to the first cell-averaging circuit 1 can be expressed by:

$$VIDL = \min.[VID, T_f(r,n) + CLDR].$$

The range interval of a cell within the range ring $i+1$ is indicated by $i.A + p$, where $i.A$ represents the range, expressed in range quants, of the first $i$ range rings, $A$ the total number of range quants dividing a range ring, and $p$ the number of range quants from the start of the range ring $i+1$ to the relevant cell in this range ring; $p = 1, 2, \ldots, A$. The azimuth interval of a cell within the azimuth sector j+1 is indicated by j.B+q, where j.B represents the azimuth, expressed in numbers of range scans, of the first j azimuth sectors, B the total number of radar scans in an azimuth sector, and q the number of radar scans from the start of the azimuth sector j+1 to the relevant cell in this azimuth sector; q=1, 2, ..., B. The video signal received in the cell (p,q) of the relevant zone is expressed by:

$$VIDL(i.A + p.j.B + q).$$

In the first cell-averaging circuit 1 this value is averaged over the cells of the relevant zone. The MT signal delivered by cell-averaging circuit 1 can then be expressed by:

$$MT = \text{constant} \cdot \sum_p \sum_q VIDL(i \cdot A + p, j \cdot B + q).$$

The number of cells involved in the summation need not per se correspond with the here defined number of cells per zone, viz. A.B. This number may vary slightly through variations in the rotational speed of the antenna through wind load. Besides, a number of cells may be blanked. The summation is therefore performed over a number of cells slightly less than A.B. If this number is not reached through blanking, the results of the averaging process are of no concern. For instance, a zone may be covered fully or for the greater part by land, while the average echo strength is to be established at sea or in a harbor. With a fixed location of the radar the blanked areas are known; a blanking circuit (not shown) is used to generate signals which are applied via line 4 to the first cell-averaging circuit 1 to indicate the blanked areas. Cell-averaging circuit 1 delivers a signal VAL which is "0" when through the blanking the MT signal is meaningless and is "1" when this signal is of interest.

The MT signal, representing the last established average echo strength in each zone, is applied to the first zone-averaging circuit 5. From the MT signal, the average echo strength $T_t(r,n)$ of the relevant zone, as determined after the previous scanning of the relevant azimuth sector by the radar beam, and from the average echo strengths of zones adjoining in azimuth and range, the first zone-averaging circuit 5 determines a new average value $GT_{t+1}(r,n)$ of the echo strength in the zone.

In view of the fact that the average echo strength of a zone of the same range ring varies relatively little, an averaging process is performed, first of all, on the zones adjoining in azimuth. Since the average echo strength of zones of the same azimuth sector clearly varies as the range, the averaging process for the zones adjoining in range is performed last. For reasons of switching, the averaging process on the time, performed in principle in between, occurs simultaneously with the averaging process performed on the zones adjoining in azimuth. In the embodiment in question the first zone-averaging circuit 5 thereto comprises a first computing means 6, a T memory 7 and a second computing means 8.

Figure 2:
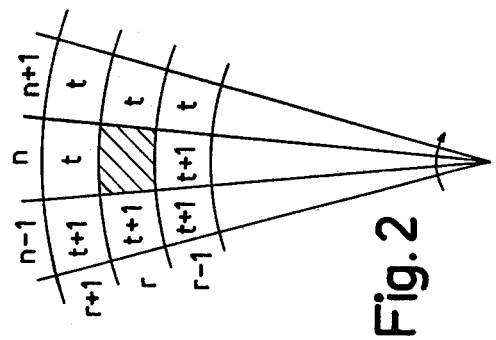
FIG. 2 is a diagram which is useful in explaining the functioning of certain parts of the threshold circuit of FIG. 1.

Before discussing the first zone-averaging circuit 5, reference should be had to FIG. 2, illustrating the zones of three azimuth sectors n−1, n and n+1, and three range rings r−1, r and r+1. The shaded portion (r,n) is the zone for which the new average echo strength $GT_{t+1}(r,n)$ must be determined. The average echo strength of the zones already scanned by the radar is determined at time t+1; the average echo strengths established during the previous radar antenna revolution at time t still apply to the zones yet to be scanned by the radar. The new average echo strength $GT_{t+1}(r,n)$ to be established for zone (r,n) is a function of the average echo strength of the surrounding zones and of the previously established values of the average echo strength of zone (r,n). In the embodiment in question, $GT_{t+1}(r,n)$ is a function of the average echo strength of the zones (r, n−1) and (r,n+1) adjoining in azimuth, viz. $T_{t+1}(r,n-1)$ and $T_t(r,n+1)$, along with the previously established average echo strength of the zone (r,n), viz. $T_t(r,n)$ established during the previous antenna revolution, and of the average echo strength of the zones adjoining in range ..., (r−3, n), (r−2, n), (r−1, n), (r+1, n), (r+2, n), (r+3, n), ..., viz. ..., $T_{t+1}(r-3, n)$, $T_{t+1}(r-2, n)$, $T_{t+1}(r-1, n)$, $T_t(r+1, n)$, $T_t(r+2, n)$, $T_t(r+3, n)$, ....

In the first computing means 6 an averaging process is performed on the zones adjoining in azimuth and on the time. The output signal of computing means 6 may be expressed by:

$$T_{t+1}(r,n) = \alpha \cdot MT + (1 - \alpha)\left[\beta T_t(r,n) + \frac{1-\beta}{2}(T_{t+1}(r,n-1) + T_t(r,n+1))\right]$$

assuming of course that signal VAL=1. In this expression $\alpha$ and $\beta$ are adjustable weighting factors.

The values obtained from this averaging process are stored in the T memory 7; this memory thereto contains a value T(r,n) for each zone. With reference to the above expression, to determine $T_{t+1}(r,n)$, the value $T_t(r,n)$ as well as the values $T_{t+1}(r,n-1)$ and $T_t(r,n+1)$ are supplied to computing means 6 by the T memory 7.

In second computing means 8 an averaging process is performed on the zones adjoining in range by accessing the values of T(r,n) stored in the T memory 7. The output signal of computing means 8 may be expressed by: $GT_{t+1}(r,n)=$constant.

$$GT_{t+1}(r,n) = \text{constant} \cdot \left[\sum_{k=0}^{N} T_{t+1}(r-k,n) + \sum_{k=1}^{N} T_t(r+k,n)\right],$$

where N is an integer. This output signal is applied to combining circuit 9. This circuit 9 in turn generates a threshold value DR, which is supplied to a gate circuit 10 to pass the video signals VID from the individual cells of a zone if these signals exceed the threshold DR.

The threshold DR can be determined more accurately if it is based not only on the average echo strength of a zone, but also on the average absolute difference between the video signals received in the individual cells and the average echo strength of this zone. This is connected with the fact that, from a mathematical point of view, the clutter has the characteristics of a Weibull distribution.

To determine the threshold value more accurately, a second cell-averaging circuit 12 and a second zone-averaging circuit 13 are incorporated. Cell-averaging circuit 12 determines the average absolute difference between the video signals VIDL, received in the individual cells and delivered by limiter 2, and the average echo strength $T_t(r,n)$ of the relevant zone. The value $|VIDL-T_t(r,n)|$ from a subtracting circuit 14 is thereto applied to the cell-averaging circuit 12. As in the case of cell-averaging circuit 1, cell-averaging circuit 12 delivers a signal MD, which can be expressed by:

$$MD = \text{constant} \cdot \underset{p}{\Sigma} \underset{q}{\Sigma} \mid VIDL(i \cdot A + p, j \cdot B + q) - T_t(r,n) \mid.$$

The averaging process is performed on the same number of cells as in the case of averaging circuit 1. For the same reason as with cell-averaging circuit 1, the aforementioned signals indicative of the blanked areas are supplied via line 15.

As in zone-averaging circuit 5, the second zone-averaging circuit 13 also consists of a first computing means 16, a D memory 17 and a second computing means 18.

Again, in computing means 16 the averaging process is performed on the zones adjoining in azimuth and on the time. The output signal of computing means 16 can be expressed by:

$$D_{t+1}(r,n) = \alpha' \cdot MD + (1 - \alpha')\left[\beta' D_t(r,n) + \frac{1-\beta'}{2}(D_{t+1}(r,n-1) + D_t(r,n+1))\right]$$

again assuming that signal VAL=1. In this expression $\alpha'$ and $\beta'$ are weighting factors.

The values obtained from this averaging process are stored in D memory 17; this memory thus contains a value D(r,n) for each zone. To determine $D_{t+1}(r,n)$, computing means 16 is supplied with the $D_t(r,n)$ value from memory 17.

In computing means 18 the averaging process is performed on the zones adjoining in range. The output signal of computing means 18 can be expressed by: $GD_{t+1}(r,n)$=constant.

$$GD_{t+1}(r,n) = \text{constant} \cdot \left[\sum_{k=0}^{N} D_{t+1}(r-k,n) + \sum_{k=1}^{N} D_t(r+k,n)\right],$$

where N is an integer.

This signal is applied to combining circuit 9 which derives a threshold value DR from this signal and from the $GT_{t+1}(r,n)$ signal of computing means 8.

In addition to memories 7 and 17 associated with the two zone-averaging circuits, another CO memory 19 may be added. In memory 19 zone offset values CO(r,n) determined by a computer can be stored for each zone. These values are supplied to the combining circuit 9, where they are used to establish the threshold value DR.

The threshold DR can be expressed by:

$$DR = GT(r,n) + CO(r,n) + GD(r,n) + \text{constant},$$

where the constant is selectable, depending on the desired false alarm rate and the nature of the clutter.

In the given description it is assumed that there are no blanked zones. In case of blanked zones, however, the MT and DT values for these zones cannot be determined in the cell-averaging circuits 1 and 12 respectively, for which the VAL signal will then be "0". Nor is it possible to include blanked zones in the averaging process performed on zones adjoining in azimuth and range. The unblanked target environs are then included in the averaging process with a greater weighting factor. If for instance the MT value and hence the MD value of the zone (r,n−1) are undefined, the values $T_{t+1}(r,n-1)$ and $D_{t+1}(r,n-1)$ in the expression of signals $T_{t+1}(r,n)$ and $D_{t+1}(r,n)$ supplied by computing means 6 and 16, respectively, are substituted by $T_t(r,n)$ and $D_t(r,n)$, respectively. Similarly, if the MT and DT values of zone (r,n+1) are undefined, the values $T_t(r,n+1)$ and $D_t(r,n+1)$ in the expression for $T_{t+1}(r,n)$ and $D_{t+1}(r,n)$ respectively, are substituted by $T_t(r,n)$ and $D_t(r,n)$ respectively. In case zone (r,n) is blanked, the MT and DT values of this zone are indeed undefined, but this does not imply the values $T_t(r,n)$ and $D_t(r,n)$; in this case the latter values are fully determined by the zones adjoining in azimuth. The result is that the averaging process on the zones adjoining in range occurs in the manner already described, without directly involving the blanked zones; the latter zones are involved indirectly only to the effect that they are assigned with a T and a D value derived from adjoining zones.

I claim:

1. A threshold circuit for radar video signals, where the radar coverage is divided into zones constituted by azimuth sectors and range rings, the zones being subdivided into cells formed by radar scans and range quants, which threshold circuit contains a first cell-averaging circuit for determining, from the video signals received in the individual cells, the average echo strength (MT) in each zone pertaining to the azimuth sector that has been scanned by the radar beam, characterized in that the threshold circuit comprises a first zone-averaging circuit, connected to the first cell-averaging circuit, for determining, from the last established average echo strength (MT) of a zone, from the average echo strength ($T_t(r,n)$) of said zone as established after the previous scanning of the relevant azimuth sector by the radar beam, and from the average echo strength of zones adjoining the azimuth and range, a new average echo strength (GT(rn,)) of the zone, means for deriving a threshold level (DR) from the new average value (GT(r,n)), and gate circuit means to which the threshold level is applied for passing the video signals received in the individual cells of the relevant zone if said video signals exceed the threshold level (DR).

2. Threshold circuit as claimed in claim 1, characterized in that the threshold circuit comprises: a second cell-averaging circuit for determining, from the difference signals which are equal to the absolute difference between the video signals received in the individual cells and the average echo strength ($T_t(r,n)$), the average value (MD) of said difference signals in each zone pertaining to the azimuth sector that has been scanned by the radar beam; and a second zone-averaging circuit for determining, from the last established average difference (MD) of a zone, from the average difference ($D_t(r,n)$) of said zone as established after the previous scanning of the relevant azimuth sector by the radar beam, and from the average difference of zones adjoining in azimuth and range, a new average difference (GD(r,n)) of the zone, which new average difference (GD(r,n)) and the new average echo strength (GT(r,n)) of said zone are applied to a combining circuit to derive the threshold level (DR).

3. Threshold circuit as claimed in claim 2, characterized in that the second zone-averaging circuit comprises: a first computing means for determining, from the last established average difference (MD) of a zone, from the average difference ($D_t(r,n)$) of said zone as established after the previous scanning of the relevant azimuth sector by the radar beam, and from the average difference of zones adjoining in azimuth, a new average value ($D_{t+1}(r,n)$) of said zone; a memory for storing the so updated average differences ($D_{t+1}(r,n)$) per zone; and a second computing means for determining, from the memory-stored average values, the new average value ($GD(r,n)$).

4. Threshold circuit as claimed in claim 2, characterized in that the threshold circuit comprises a limiter for limiting the amplitude of the video signal (VID) received in each cell to a value (CL), said value (CL) being determined by the average echo strength ($T_t(r,n)$) of the relevant zone, increased by a selectable constant value (CLDR), of which limiter the output signal (VIDL) is the video information for the first cell-averaging circuit.

5. Threshold circuit as claimed in claim 4, characterized in that the threshold circuit comprises a subtracter whose output signal ($|VIDL-T_t(r,n)|$) is the absolute difference between the output signal (VIDL) of the limiter and the average echo strength ($T_t(r,n)$) of the relevant zone, which output signal ($|VIDL-T_t(r,n)|$) forms the information for the second cell-averaging circuit.

6. Threshold circuit as claimed in claim 2, characterized in that the threshold circuit comprises a memory for storing computer-determined zone offset values ($CO(r,n)$), which zone offset values, together with the values ($GT(r,n)$) and $gd(r,n)$) from the two zone-averaging circuits, are applied to the combining circuit to derive the threshold level (DR).

7. Threshold circuit as claimed in claim 1, characterized in that the first zone-averaging circuit comprises: a first computing means for determining, from the last established average echo strength (MT) of a zone, from the average echo strength ($T_t(r,n)$) of said zone as established after the previous scanning of the relevant azimuth sector by the radar beam, and from the average echo strength of zones adjoining in azimuth, a new average echo strength ($T_{t+1}(r,n)$) of said zone; a memory for storing the so updated average echo strength ($T_{t+1}(r,n)$) per zone; and a second computing means for determining, from the memory-stored average echo strengths, the new average value ($GT(r,n)$) for a number of zones adjoining in range.

* * * * *